No. 767,551. Patented August 16, 1904.

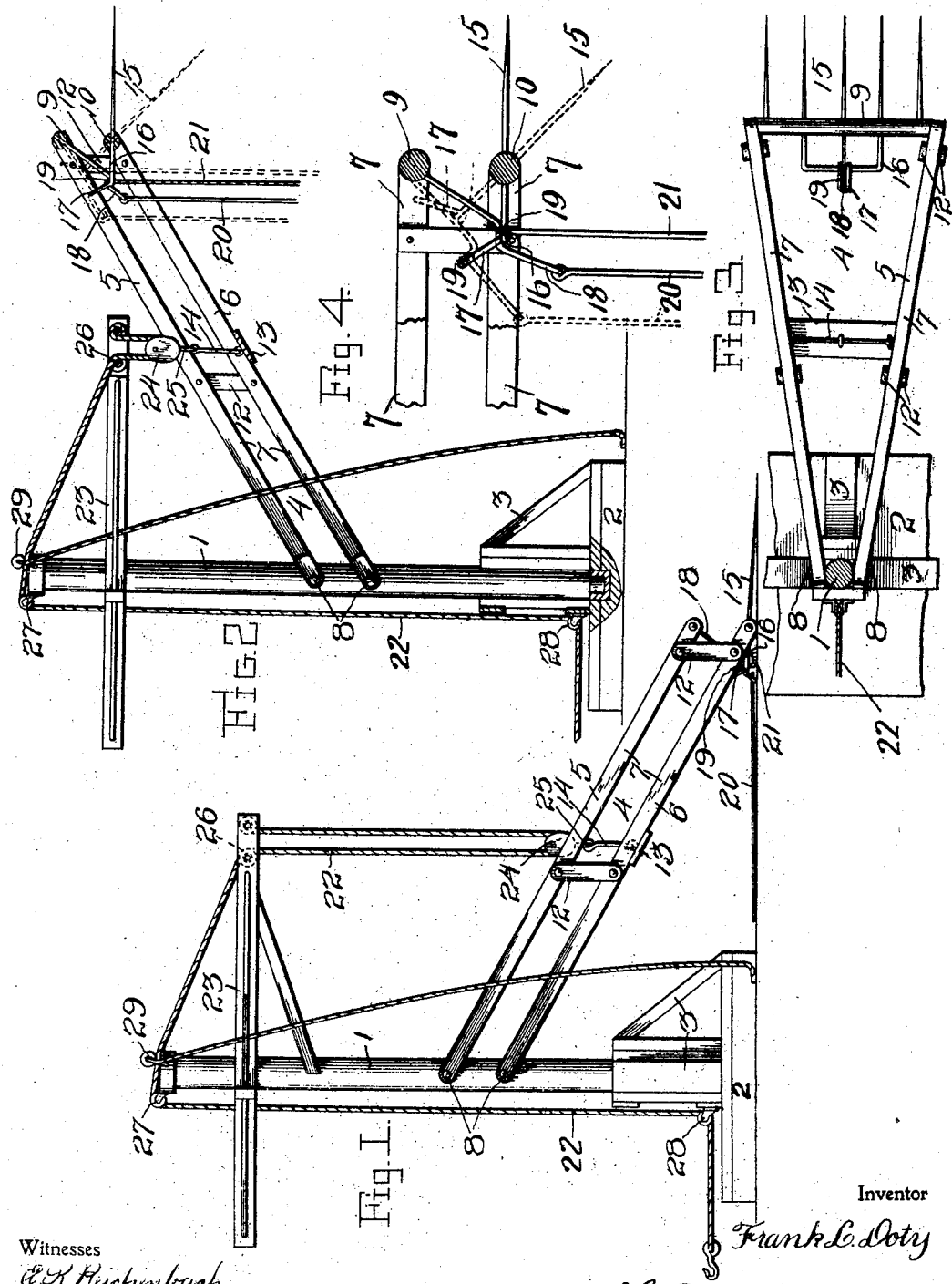

UNITED STATES PATENT OFFICE.

FRANK L. DOTY, OF CALLIOPE, IOWA.

HAY-STACKER.

SPECIFICATION forming part of Letters Patent No. 767,551, dated August 16, 1904.

Application filed February 11, 1904. Serial No. 193,173. (No model.)

*To all whom it may concern:*

Be it known that I, FRANK L. DOTY, a citizen of the United States, residing at Calliope, in the county of Sioux and State of Iowa, have invented certain new and useful Improvements in Hay-Stackers; and I do declare the following to be a full, clear, and exact description of the invention, such as will enable others skilled in the art to which it appertains to make and use the same.

This invention relates to improvements in hay-stackers.

The object of the invention is to provide a device of this character by which hay, straw, or the like may be quickly and easily loaded onto a wagon or piled onto a stack.

A further object is to provide a device of this character which will be strong and durable, efficient and easily operated, and which will greatly facilitate the handling of hay, straw, and the like.

With these and other objects in view the invention consists of certain novel features of construction, combination, and arrangement of parts, as will be more fully described, and particularly pointed out in the appended claims.

In the accompanying drawings, Figure 1 is a side elevation of the invention, showing the same in position to receive a deposit of hay. Fig. 2 is a vertical sectional view showing the parts in raised position for discharging the deposit of hay and in dotted lines showing the same dumped. Fig. 3 is a top plan view of the loader. Fig. 4 is an enlarged detail view of the outer end of the elevating frame, fork, and latch-bar, showing the different positions of the fork and latch-bar in full and broken lines.

Referring more particularly to the drawings, 1 denotes an upright post or standard revolubly mounted in a suitable base 2 and suitably braced by inclined brace-bars 3, as shown. To the opposite sides of the post or standard 1 is pivotally connected the upper end of a triangular carrying or elevating frame 4, which is formed of upper and lower sections or frames 5 and 6, arranged one above the other, as shown. Each of the frames 5 and 6 consists of diverging side bars 7, pivotally connected at their upper ends to the post 1 by bolts 8. The lower ends of the side bars of the upper and lower frames are connected by cross-bars 9 and 10. The side bars of the upper and lower frames are spaced apart and connected together by means of parallel plates or bars 12, so as to have a slight movement one upon the other as the same are swung up or down on the post 1. The side bars of the lower frame are provided about midway their ends with a cross bar or plate 13, to which is connected a bail 14, by which the frame is elevated.

The cross-bar 10 of the lower frame 6 is pivotally connected to ends of the side bars 7, and on said cross-bar is formed a fork 15, the tines of which project forwardly and are adapted to receive the load of hay. On the rear side of the bar 10 is formed a rearwardly-projecting frame 16, on which is formed an upwardly-projecting guide-loop 17.

On the cross-bar 9 of the upper frame 5 is pivotally connected the upper end of a latch-bar 18, which passes through the loop 17, by which it is guided and held in place. The latch-bar 18 is provided with a shoulder or offset 19, which normally engages the frame 16 and holds the bar 10 and fork from turning when said fork is loaded. To the lower end of the latch-bar is pivotally connected a releasing-rod 20, by which the shoulder on the latch-bar may be released from the frame 16 to permit the fork to dump and discharge its load. A cord 21 is secured to the frame 16 and extends to within convenient reach of the operator when the frame is raised, so that after the fork has dumped it may be returned to its normal position and again be engaged by the latch-bar.

In order that the frame 4 may be elevated or swung upwardly on the post 1, a hoisting rope or cable 22 is provided, one end of which is secured to a suitably-braced boom 23, fixed to the upper end of the revolving post 1. A pulley 24, having a hook 25, is engaged with the bail 14 of the frame 4, and through said pulley is passed the hoisting-rope 22, which then passes upwardly over a guide-pulley 26, journaled in the end of the boom, thence back and over a pulley 27, mounted on the upper end of the post 1, then downwardly and under a pulley 28 on the lower end of the standard, and on the end is secured a hook for the attachment of a whiffletree or other draft device.

If desired, a friction-brake may be employed, as shown at 29, to engage the hoisting-rope and hold the frame 4 elevated while the load is being discharged from the fork.

In operation, assuming the parts to be in a lowered position, as shown in Fig. 1, the hay is now drawn up to the same by a rake or other means and dumped upon the fork, and when the same has been filled the hoisting-cable is operated to raise the frame and fork to the desired level. The post 1 is now turned, by means of a lever or other suitable appliance (not shown) attached thereto, to bring the frame and fork over the wagon or stack and the latch-bar released, which will permit the fork to discharge the load of hay into the wagon or on the stack, as the case may be. The rope or cord 21 is now pulled and the fork again restored to its normal position and the parts lowered for another charge of hay.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a hay-stacker, the combination with a revolving support, of a frame pivotally connected to said support to swing upwardly, said frame consisting of upper and lower frames or sections spaced apart and pivotally connected together by bars or plates, a fork pivotally mounted in the outer end of said lower frame, a latch-bar carried by said upper frame to engage said fork and hold the same in a horizontal position to support a load, means for releasing said latch-bar to permit said fork to dump and discharge the load, and means for hoisting or swinging said frame upwardly, substantially as described.

2. In a hay-stacker, the combination with a revolving support, of a frame pivotally connected to said support to swing upwardly, said frame consisting of upper and lower frames or sections spaced apart and pivotally connected together by bars or plates, a fork pivotally mounted in the outer end of said lower frame, a latch-bar carried by said upper frame to engage said fork and hold the same in a horizontal position to support a load, a releasing-rod pivotally connected to said latch-bar to release the same when said frame is in an elevated position, to permit said fork to dump and discharge said load, means for restoring the fork to its normal position, and means for hoisting or swinging said frame upwardly, substantially as described.

In testimony whereof I have hereunto set my hand in presence of two subscribing witnesses.

FRANK L. DOTY.

Witnesses:
L. L. YOUNIE,
THOMAS CUNNINGHAM.